(12) United States Patent
Tratch

(10) Patent No.: US 9,637,322 B1
(45) Date of Patent: May 2, 2017

(54) SEALING BELT CONVEYORS AGAINST PRODUCT LEAKAGE

(71) Applicant: Brandt Agricultural Products Ltd., Regina (CA)

(72) Inventor: Jaime Nolin Tratch, Regina Saskatchewan (CA)

(73) Assignee: Brandt Agricultural Products Ltd., Regina, SK (CA)

(*) Notice: Subject to any disclaimer, the term of this patent is extended or adjusted under 35 U.S.C. 154(b) by 0 days.

(21) Appl. No.: 15/178,906

(22) Filed: Jun. 10, 2016

(51) Int. Cl.
*B65G 47/18* (2006.01)
*B65G 45/00* (2006.01)
*B65G 15/08* (2006.01)
*B65G 15/62* (2006.01)
*B65G 21/20* (2006.01)
*B65G 39/09* (2006.01)

(52) U.S. Cl.
CPC ............. *B65G 45/00* (2013.01); *B65G 15/08* (2013.01); *B65G 15/62* (2013.01); *B65G 21/2081* (2013.01); *B65G 39/09* (2013.01); *B65G 2201/042* (2013.01)

(58) Field of Classification Search
CPC ........ B65G 45/00; B65G 15/08; B65G 15/62; B65G 21/2081; B65G 39/09
USPC .......................... 198/311, 818, 823–830, 841
See application file for complete search history.

(56) References Cited

U.S. PATENT DOCUMENTS

| 5,400,897 | A * | 3/1995 | Doyle | B65G 45/18 198/496 |
| 6,349,812 | B1 * | 2/2002 | Epp | B65G 23/44 198/318 |
| 7,588,405 | B2 * | 9/2009 | Johnson | B65G 21/02 198/823 |
| 7,690,499 | B2 * | 4/2010 | Smith | B65G 15/08 198/690.2 |
| 8,727,108 | B2 | 5/2014 | Dekoning | |
| 2002/0038757 | A1 * | 4/2002 | Eberlc | B65G 15/08 198/820 |

* cited by examiner

*Primary Examiner* — William R Harp
(74) *Attorney, Agent, or Firm* — Frost Brown Todd LLC

(57) ABSTRACT

A belt conveyor has an upward sloping tube and a hopper extending outward from the lower intake end of the tube. A belt has an upper run passing along a hopper floor of the hopper then over a top S-roller of an S-roller assembly, under a bottom S-roller thereof, and up through the tube. Resilient bottom seal strips each extend along each side of the hopper with lower edges thereof bearing against the belt adjacent to side edges of the belt and resilient top seal strips are fastened on top of the corresponding bottom seal strips such that a lower edge of each top seal strip bears against the belt beside the lower edge of the corresponding bottom seal strip. Roller seals seal edges of the S-rollers and the belt passing therethrough, and a support surface supports the belt between the bottom S-roller and the intake end of the tube.

22 Claims, 3 Drawing Sheets

SEALING BELT CONVEYORS AGAINST PRODUCT LEAKAGE

This disclosure relates to the field of conveying equipment and in particular a seeding apparatus for one pass seeding and fertilizing.

BACKGROUND

Typically belt conveyors for granular material such as grain, oilseeds, fertilizer, and like agricultural products typically comprise an upper run of the belt passing through a tube that supports the belt in a troughed configuration. The tube is mounted on a mobile framework in an inclined orientation. The belt passes over a top roller at the upper discharge end of the conveyor, and the return run of the belt runs under the tube in a flat orientation supported by idler rollers, plate sections or the like spaced at suitable intervals under the conveyor.

The return run typically passes through an S-drive mounted under the conveyor tube. In the S-drive, idler rollers cause the belt to wrap around the drive roller, increasing the frictional force between the belt and drive roller and allowing significant power to be transferred from the drive roller to the belt.

A typical portable conveyor for agricultural products will be mounted in a frame supported on wheels and include an actuator operative to raise and lower an upper discharge end of a conveyor tube while the lower intake end stays near the ground to receive agricultural products to be carried up the conveyor and discharged into the top of a grain bin. The lower receiving end typically includes a metal hoppered intake section where the belt runs flat before passing into the tube and moving to the troughed orientation inside the tube. In this flat portion the edges of the belt may be curved up somewhat, and there will be a seal strip, typically a stiff rubber strip, fastened along a top edge thereof to the walls of the hopper such that the lower edge thereof bears against the belt to prevent granular material from moving off the side edges of the belt.

In belt conveyors for agricultural products, there is also often a hoppered intake portion attached to the bottom end of the conveyor and extending outward generally horizontally at an angle to the tube so that the intake portion can be positioned under the center discharge of a belly dump grain trailer for example. The top run of the belt then runs horizontal to the bottom end of the tube then must make an angle upward. The belt is under tension and in response to that tension tends to rise as it turns upward from the horizontal to enter the inclined tube. In order to hold the belt down, it is common to provide an S-roller assembly whereby the belt passes from the front end of the hopper rearward over a first roller at the bottom of the tube and under a second roller that is under the first roller then up the inclined tube.

Problems commonly arise when conveying small particles such as grains, and in particular very small oily particles such as canola or flax. The seeds tend to move over the side edges of the belt, for example at the S-roller assembly and under the seal strips. The seeds gather under various portions of the belt and under the seal strip where they are crushed. The crushed oilseeds release oil which causes the belt to slip on the drive rollers, and the crushed seeds are very sticky and gummy and build up on the belt and rollers, under the seal strip, and in various other areas under and around the belt, fouling the mechanisms.

U.S. Pat. No. 8,727,108 to Dekoning addresses this problem by providing a seal over raised edges of the belt in the intake area, and a trap opening configured to allow seeds moving up the tube under the belt to fall out of the tube.

SUMMARY OF THE INVENTION

The present disclosure provides a belt conveyor apparatus that overcomes problems in the prior art.

In a first embodiment the present disclosure provides a belt conveyor apparatus comprising a tube mounted on a frame supported on wheels for travel on a ground surface, the tube sloping upward from a lower intake end to an upper discharge end and a hopper extending outward along the ground surface from the lower intake end of the tube. A belt has an upper run passing along a hopper floor of the hopper then over a top S-roller of an S-roller assembly and under a bottom S-roller of the S-roller assembly, and up through the tube to the discharge end of the tube, and with a return run extending under the tube and hopper. Right and left sidewalls of the hopper extend upward and outward from side edges of the hopper floor. Resilient right and left bottom seal strips each extend from a front end of the hopper to a rear portion of the hopper over the top S-roller and are fastened along an upper edge thereof to a corresponding sidewall such that a lower edge of each bottom seal strip bears against a top surface of the belt adjacent to a side edge of the belt. Resilient right and left top seal strips each extend from the front end of the hopper to the rear portion of the hopper over the top S-roller and are fastened along an upper edge thereof to a corresponding sidewall on top of the corresponding bottom seal strip such that a lower edge of each top seal strip bears against a top surface of the belt beside the lower edge of the corresponding bottom seal strip.

In a second embodiment the present disclosure provides a belt conveyor apparatus comprising a tube mounted on a frame supported on wheels for travel on a ground surface, the tube sloping upward from a lower intake end to an upper discharge end and a hopper extending outward along the ground surface from the lower intake end of the tube. A belt has an upper run passing along a hopper floor of the hopper then over a top S-roller of an S-roller assembly and under a bottom S-roller of the S-roller assembly, and up through the tube to the discharge end of the tube, and with a return run extending under the tube and hopper. The S-rollers are each mounted on a roller shaft extending through right and left frame walls, and the roller shafts extend through resilient right and left roller seal plates attached to the corresponding right and left frame walls. Right and left side edges of the belt bear against outer surfaces of the corresponding right and left roller seal plates as the belt passes through the S-roller assembly, and outer ends of the S-rollers extend into the right and left roller seal plates to seal the right and left seal plates against outer surfaces of the S-roll ers.

In a third embodiment the present disclosure provides a belt conveyor apparatus comprising a tube mounted on a frame supported on wheels for travel on a ground surface, the tube sloping upward from a lower intake end to an upper discharge end and a hopper extending outward along the ground surface from the lower intake end of the tube. A belt has an upper run passing along a hopper floor of the hopper then over a top S-roller of an S-roller assembly and under a bottom S-roller of the S-roller assembly, and up through the tube to the discharge end of the tube, and with a return run extending under the tube and hopper. A support surface is positioned under the upper run of the belt between the lower S-roller and the lower intake end of the tube such that the belt slides over the support surface.

The present disclosure provides a belt conveyor apparatus where leakage of granular material off the belt is reduced. Leakage areas are provided with improved seals, with two separate seals along the top of the generally horizontal section of the belt running through the hopper, and roller seals sealing ends of the S-rollers and providing a tightly fitting groove where the belt edges run preventing migration of material off the belt. Supporting the bottom of the belt with the support surface and transition plates prevents the belt from deforming under the weight of granular material propelled onto the inclined portion of the belt adjacent to the bottom S-roller.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
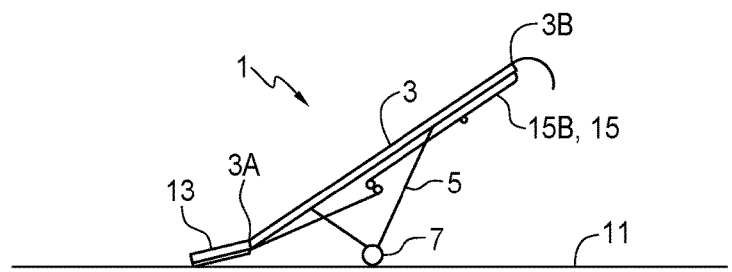
FIG. 1 is a schematic side view of an embodiment of a belt conveyor apparatus of the present disclosure.
Figure 2:
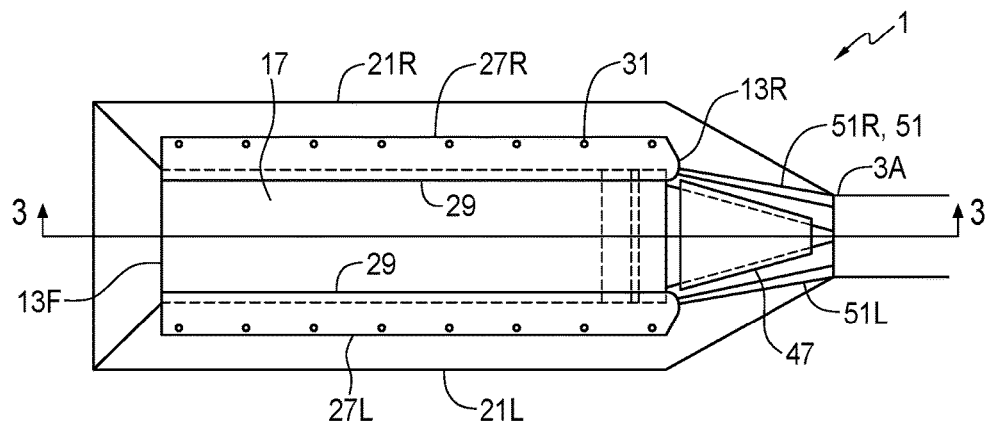
FIG. 2 is a top view of the hopper and intake end of the tube of the embodiment of FIG. 1 with the belt removed for illustration purposes.
Figure 3:
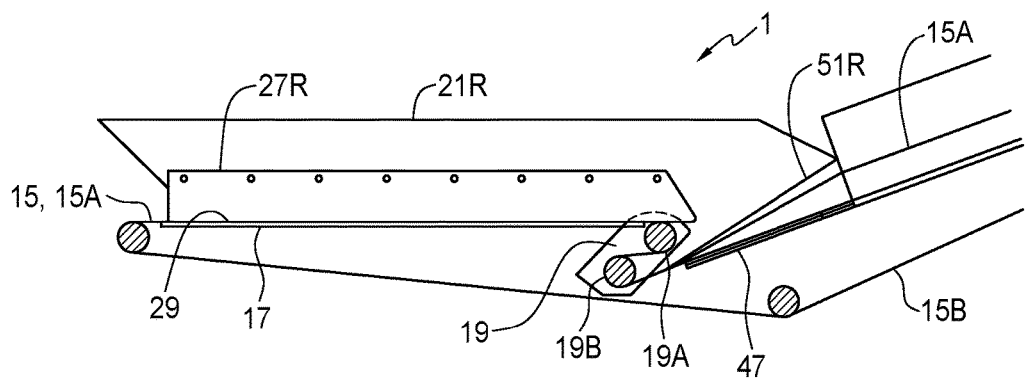
FIG. 3 is a schematic sectional side view along line 3-3 in FIG. 2 with the belt installed.

FIGS. 1-3 schematically illustrate an embodiment of a belt conveyor apparatus 1 of the present disclosure. The apparatus 1 comprises a tube 3 mounted on a frame 5 supported on wheels 7 for travel on a ground surface 11. The tube 3 slopes upward from a lower intake end 3A thereof to an upper discharge end 3B, and a hopper 13 extends outward along the ground surface 11 from the lower intake end 3A of the tube 3. The hopper 13 is configured as is known in the art to reach under a bottom discharge of a trailer to receive granular material such as grain and the like.

A belt 15 has an upper run 15A passing along a hopper floor 17 of the hopper 13 then over a top S-roller 19A of an S-roller assembly 19, and under a bottom S-roller 19B of the S-roller assembly 19, and then up through the tube 3 to the discharge end 3B of the tube 3, and has a return run 15B extending under the tube 3 and hopper 13 as can be seen if FIG. 3. FIG. 3 is a schematic sectional view along line 3-3 in the top view of FIG. 2. In FIG. 2 the belt has been removed to allow for illustration of the apparatus 1, and the belt 15 is shown in FIG. 3.

Figure 4:
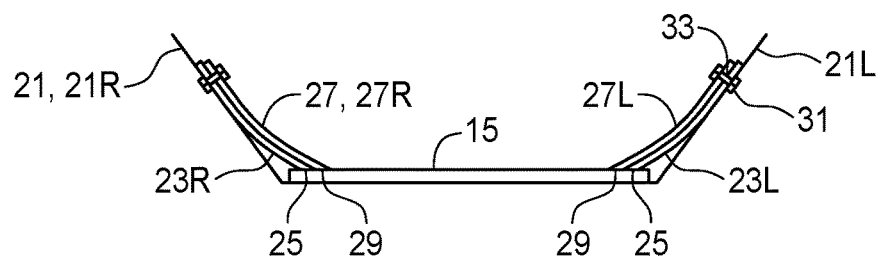
FIG. 4 is a schematic sectional end view of the hopper and top and bottom seal strips of the embodiment of FIG. 1.

Right and left sidewalls 21R, 21L of the hopper 13 extend upward and outward from side edges of the hopper floor 17. Resilient right and left bottom seal strips 23R, 23L each extend from a front end 13F of the hopper 13 to a rear portion 13R of the hopper 13 over the top S-roller 19A and is fastened along an upper edge thereof to a corresponding sidewall 21 such that a lower edge 25 of each bottom seal strip 23 bears against a top surface of the belt 15 adjacent to a side edge of the belt 15, as schematically illustrated in FIG. 4.

Resilient right and left top seal strips 27R, 27L each extend from a front end 13F of the hopper 13 to a rear portion 13R of the hopper over the top S-roller 19 and fastened along an upper edge thereof to a corresponding sidewall 21 on top of the corresponding bottom seal strip 23 such that a lower edge 29 of each top seal strip 27 bears against a top surface of the belt 15 beside the lower edge 25 of the corresponding bottom seal strip 23.

The top seal strips 27 are slightly wider than the bottom seal strips 23, and the top and bottom seal strips 23, 27 are conveniently attached to the corresponding sidewalls 21 by fasteners 31 through common holes 33 in the seal strips 23, 27 and sidewalls 21.

The two seals 23, 27 provide a double lip seal system to prevent granular material from reaching the edge of the belt 15. The two bottom edges 25, 29 are close together but distinct and material leaking under the bottom edge 29 of the top seal strip 23 is blocked from migrating to the edge of the belt 15 by the bottom edge 25 of the bottom seal strip 23. When a single seal strip is used the weight of the material on the strip deforms the strip and forces particles under the seal strip. When the top seal strip 27 is placed over the bottom seal strip 23, the additional seal strip provides relief from the weight of the material and allows the bottom seal strip to maintain an effective seal.

Figure 5:
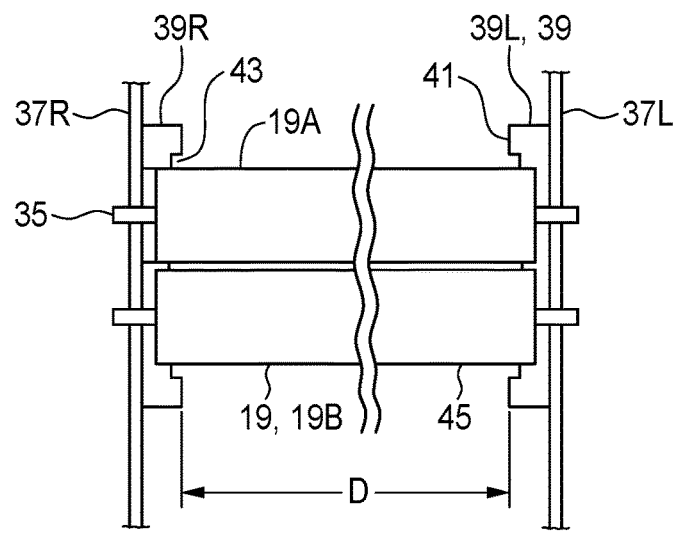
FIG. 5 is a schematic sectional end view of the S-roller assembly of the embodiment of FIG. 1 with the belt removed for illustration purposes.
Figure 6:
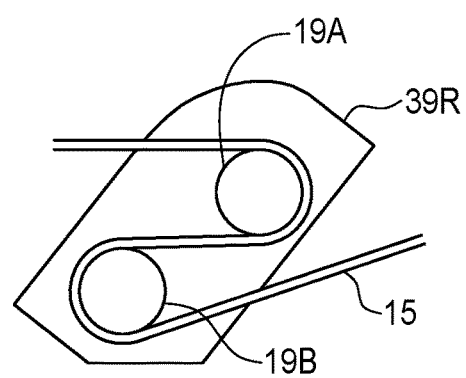
FIG. 6 is a schematic sectional side view of the S-roller assembly and right roller seal plate with the belt installed.
Figure 7:
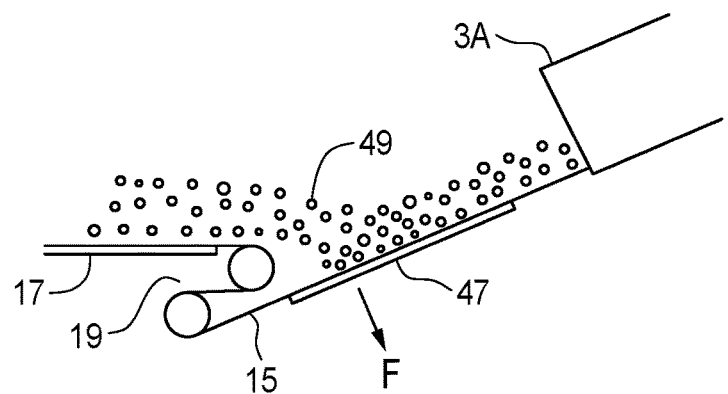
FIG. 7 is a schematic sectional side view showing the movement of granular material from the generally horizontal portion of the belt passing along the hopper floor to the inclined portion of the belt between the bottom S-roller and the intake end of the tube of the embodiment of FIG. 1.
Figure 8:
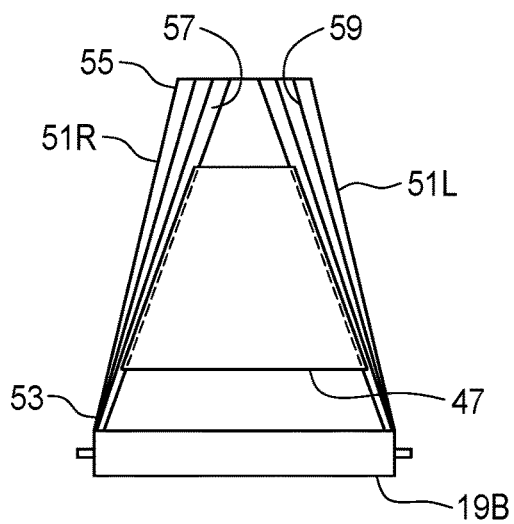
FIG. 8 is a schematic top view of the bottom S-roller, the support surface, and the transition plates of the embodiment of FIG. 1 with the belt removed for illustration purposes.
Figure 9:
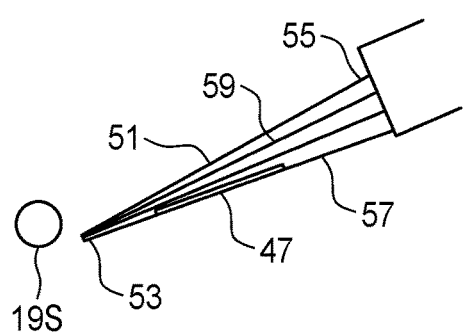
FIG. 9 is a schematic side view of the bottom S-roller, the support surface, and the transition plates shown in FIG. 8, again with the belt removed for illustration purposes.

As schematically illustrated in FIGS. 5 and 6 the S-rollers 19A, 19B are each mounted on a roller shaft 35 extending through right and left frame walls 37R, 37L. The roller shafts 35 extend through resilient right and left roller seal plates 39R, 39L attached to the corresponding right and left frame walls 37R, 37L. The distance D between the outer surfaces of the right and left roller seal plates 39R, 39L is less than a width of the belt 15, such that right and left side edges of the belt 15 bear against outer surfaces 41 of the corresponding right and left roller seal plates 39R, 39L as the belt 15 passes through the S-roller assembly 19 and the moving belt wears a groove 43 in the outer surface 41 of each roller seal plate 39 and the side edges of the belt 15 move in the grooves 43, effectively sealing the side edges of the belt 15 to prevent particles from moving off the belt 15.

In FIG. 5 the belt 15 has been removed to allow for illustration of the apparatus 1, and the belt 15 is shown in FIG. 6. As seen in FIG. 5 the outer ends of the S-rollers 19 extend into the right and left roller seal plates 39 to seal the right and left seal plates 39 against outer surfaces 45 of the S-rollers 19. FIG. 6 schematically illustrates the roller seal plate 39R and the belt 15 passing through the S-rollers 19A, 19B.

As seen in FIGS. 2 and 3 a support surface 47 is positioned under the upper run 15A of the belt 15 between the lower S-roller 19B and the lower intake end 3A of the tube 3 such that the belt 15 slides over the support surface 47. During operation, granular material 49 is propelled at significant speed from the from the rear end of the belt 15 running generally horizontally along the floor 17 of the hopper onto the inclined portion of the belt between the bottom S-roller 19B and the intake end 3A of the tube, exerting considerable forces F tending to distort the belt 15 such that granular material moves off the side edges thereof. The support surface 47 prevents downward movement and distortion of the belt 15. The support surface will typically be provided by a pan or plate but could be provided by a plurality of rods or bars spaced close enough together to prevent downward movement of the belt 15.

Right and left transition plates 51R, 51L extend from front ends 53 thereof adjacent to the bottom S-roller 19B to rear ends 55 thereof at the lower intake end 3A of the tube 3. The transition plates 51 are configured to force the belt 15 from a flat orientation at the bottom S-roller 19B to a troughed orientation at the lower intake end 3A of the tube. The transition plates 51 each comprise a substantially flat portion 57 extending under corresponding right and left side portions of the belt 15, and forming portions 59 tapering upward and inward from the front end of the transition plate to the rear end of the transition plate. Conveniently the support surface 47 is attached to the flat portions 57 of the right and left transition plates 51R, 51L.

The support surface 47 and transition plates 51 support the bottom surface of the belt through the transition from a flat orientation leaving the bottom S-roller 19B to the troughed orientation entering the intake end 3A of the tube 3. With the belt 15 supported the tendency for the side edges thereof to pull away from the supporting walls and allow leakage is reduced.

The present disclosure provides a belt conveyor apparatus 1 where leakage of granular material off the belt 15 is reduced by sealing vulnerable areas and supporting the bottom of the belt so that the weight of granular material 49 on the belt 15 does not deform the belt.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:
1. A belt conveyor apparatus comprising:
   a tube mounted on a frame supported on wheels for travel on a ground surface, the tube sloping upward from a lower intake end to an upper discharge end;
   a hopper extending outward along the ground surface from the lower intake end of the tube;
   a belt with an upper run passing along a hopper floor of the hopper then over a top S-roller of an S-roller assembly and under a bottom S-roller of the S-roller assembly, and up through the tube to the discharge end of the tube, and with a return run extending under the tube and hopper;
   wherein right and left sidewalls of the hopper extend upward and outward from side edges of the hopper floor;
   resilient right and left bottom seal strips, each bottom seal strip extending from a front end of the hopper to a rear portion of the hopper over the top S-roller and fastened along an upper edge thereof to a corresponding sidewall such that a lower edge of each bottom seal strip bears against a top surface of the belt adjacent to a side edge of the belt;
   resilient right and left top seal strips, each top seal strip extending from the front end of the hopper to the rear portion of the hopper over the top S-roller and fastened along an upper edge thereof to a corresponding sidewall on top of the corresponding bottom seal strip such that a lower edge of each top seal strip bears against a top surface of the belt beside the lower edge of the corresponding bottom seal strip.

2. The apparatus of claim 1 wherein the top seal strips are wider than the bottom seal strips, and wherein the right and left top and bottom seal strips are attached to the corresponding right and left sidewalls by fasteners through common holes in the seal strips and sidewalls.

3. The apparatus of claim 1 wherein the S-rollers are each mounted on a roller shaft extending through right and left frame walls, wherein the roller shafts extend through resilient right and left roller seal plates attached to the corresponding right and left frame walls, and wherein right and left side edges of the belt bear against outer surfaces of the corresponding right and left roller seal plates as the belt passes through the S-roller assembly.

4. The apparatus of claim 3 wherein outer ends of the S-rollers extend into the right and left roller seal plates to seal the right and left seal plates against outer surfaces of the S-rollers.

5. The apparatus of claim 3 wherein a distance between the outer surfaces of the right and left roller seal plates is less than a width of the belt, such that moving the belt wears a groove in the outer surface of each of the right and left roller seal plates and the side edges of the belt move in the grooves.

6. The apparatus of claim 1 comprising a support surface positioned under the upper run of the belt between the lower S-roller and the lower intake end of the tube such that the belt slides over the support surface.

7. The apparatus of claim 6 comprising right and left transition plates extending from front ends thereof adjacent to the bottom S-roller to rear ends thereof at the lower intake end of the tube, the transition plates configured to force the belt from a flat orientation at the bottom S-roller to a troughed orientation at the lower intake end of the tube.

8. The apparatus of claim 7 wherein the transition plates each comprise a substantially flat portion extending under corresponding right and left side portions of the belt, and forming portions tapering upward and inward from the front end of the transition plate to the rear end of the transition plate.

9. The apparatus of claim 8 wherein the support surface is attached to the flat portions of the right and left transition plates.

10. A belt conveyor apparatus comprising:
    a tube mounted on a frame supported on wheels for travel on a ground surface, the tube sloping upward from a lower intake end to an upper discharge end;
    a hopper extending outward along the ground surface from the lower intake end of the tube;
    a belt with an upper run passing along a hopper floor of the hopper then over a top S-roller of an S-roller assembly and under a bottom S-roller of the S-roller assembly, and up through the tube to the discharge end of the tube, and with a return run extending under the tube and hopper;
    wherein the S-rollers are each mounted on a roller shaft extending through right and left frame walls, wherein the roller shafts extend through resilient right and left roller seal plates attached to the corresponding right and left frame walls, and wherein right and left side edges of the belt bear against outer surfaces of the corresponding right and left roller seal plates as the belt passes through the S-roller assembly and outer ends of the S-rollers extend into the right and left roller seal plates to seal the right and left seal plates against outer surfaces of the S-rollers.

11. The apparatus of claim 10 wherein a distance between the outer surfaces of the right and left roller seal plates is less than a width of the belt, such that moving the belt wears a groove in the outer surface of each of the right and left roller seal plates and the side edges of the belt move in the grooves.

12. The apparatus of claim 10 wherein right and left sidewalls of the hopper extend upward and outward from side edges of the hopper floor and comprising:

resilient right and left bottom seal strips, each bottom seal strip extending from a front end of the hopper to a rear portion of the hopper over the top S-roller and fastened along an upper edge thereof to a corresponding sidewall such that a lower edge of each bottom seal strip bears against a top surface of the belt adjacent to a side edge of the belt;

resilient right and left top seal strips, each top seal strip extending from a front end of the hopper to a rear portion of the hopper over the top S-roller and fastened along an upper edge thereof to a corresponding sidewall on top of the corresponding bottom seal strip such that a lower edge of each top seal strip bears against a top surface of the belt beside the lower edge of the corresponding bottom seal strip.

13. The apparatus of claim 10 comprising a support surface positioned under the upper run of the belt between the lower S-roller and the lower intake end of the tube such that the belt slides over the support surface.

14. The apparatus of claim 13 comprising right and left transition plates extending from front ends thereof adjacent to the bottom S-roller to rear ends thereof at the lower intake end of the tube, the transition plates configured to force the belt from a flat orientation at the bottom S-roller to a troughed orientation at the lower intake end of the tube.

15. The apparatus of claim 14 wherein the transition plates each comprise a substantially flat portion extending under corresponding right and left side portions of the belt, and forming portions tapering upward and inward from the front end of the transition plate to the rear end of the transition plate.

16. The apparatus of claim 15 wherein the support surface is attached to the flat portions of the right and left transition plates.

17. A belt conveyor apparatus comprising:

a tube mounted on a frame supported on wheels for travel on a ground surface, the tube sloping upward from a lower intake end to an upper discharge end;

a hopper extending outward along the ground surface from the lower intake end of the tube;

a belt with an upper run passing along a hopper floor of the hopper then over a top S-roller of an S-roller assembly and under a bottom S-roller of the S-roller assembly, and up through the tube to the discharge end of the tube, and with a return run extending under the tube and hopper; and a support surface positioned under the upper run of the belt between the lower S-roller and the lower intake end of the tube such that the belt slides over the support surface.

18. The apparatus of claim 17 comprising right and left transition plates extending from front ends thereof adjacent to the bottom S-roller to rear ends thereof at the lower intake end of the tube, the transition plates configured to force the belt from a flat orientation at the bottom S-roller to a troughed orientation at the lower intake end of the tube.

19. The apparatus of claim 18 wherein the transition plates each comprise a substantially flat portion extending under corresponding right and left side portions of the belt, and forming portions tapering upward and inward from the front end of the transition plate to the rear end of the transition plate.

20. The apparatus of claim 19 wherein the support surface is attached to the flat portions of the right and left transition plates.

21. The apparatus of claim 17 wherein right and left sidewalls of the hopper extend upward and outward from side edges of the hopper floor and comprising:

resilient right and left bottom seal strips, each bottom seal strip extending from a front end of the hopper to a rear portion of the hopper over the top S-roller and fastened along an upper edge thereof to a corresponding sidewall such that a lower edge of each bottom seal strip bears against a top surface of the belt adjacent to a side edge of the belt;

resilient right and left top seal strips, each top seal strip extending from a front end of the hopper to a rear portion of the hopper over the top S-roller and fastened along an upper edge thereof to a corresponding sidewall on top of the corresponding bottom seal strip such that a lower edge of each top seal strip bears against a top surface of the belt beside the lower edge of the corresponding bottom seal strip.

22. The apparatus of claim 17 wherein the S-rollers are each mounted on a roller shaft extending through right and left frame walls, and wherein the roller shafts extend through resilient right and left roller seal plates attached to the corresponding right and left frame walls, and wherein:

wherein a distance between the outer surfaces of the right and left roller seal plates is less than a width of the belt, such that right and left side edges of the belt bear against outer surfaces of the corresponding right and left roller seal plates as the belt passes through the S-roller assembly;

outer ends of the S-rollers extend into the right and left roller seal plates to seal the right and left seal plates against outer surfaces of the S-rollers; and the side edges of the belt move in grooves worn in the inner surface of each of the right and left roller seal plates.

* * * * *